United States Patent
Duesing (10) Patent No.: US 9,885,481 B2
(45) Date of Patent: Feb. 6, 2018

(54) SEQUENTIAL COMBUSTION WITH DILUTION GAS MIXER

(71) Applicant: ANSALDO ENERGIA SWITZERLAND AG, Baden (CH)

(72) Inventor: Michael Duesing, Rheinfelden (DE)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 365 days.

(21) Appl. No.: 14/445,162

(22) Filed: Jul. 29, 2014

(65) Prior Publication Data
US 2015/0047365 A1    Feb. 19, 2015

(30) Foreign Application Priority Data

Aug. 15, 2013    (EP) .................................... 13180583

(51) Int. Cl.
    F23R 3/34    (2006.01)
    F23R 3/16    (2006.01)
    (Continued)

(52) U.S. Cl.
    CPC .............. *F23R 3/346* (2013.01); *F02C 7/228* (2013.01); *F23R 3/16* (2013.01); *F23R 3/18* (2013.01);
    (Continued)

(58) Field of Classification Search
    CPC ...... F23R 3/16; F23R 3/18; F23R 3/20; F23R 3/34; F23R 3/346; F23R 2900/03341; F02C 7/228
    See application file for complete search history.

(56) References Cited

U.S. PATENT DOCUMENTS

| 4,887,425 A * | 12/1989 | Vdoviak ................. F23D 11/36 |
| | | 60/742 |
| 6,817,187 B2 * | 11/2004 | Yu ........................... F02C 3/365 |
| | | 60/39.17 |

(Continued)

FOREIGN PATENT DOCUMENTS

| DE | 195 47 913 A1 | 6/1997 |
| DE | 103 12 971 A1 | 12/2004 |

(Continued)

OTHER PUBLICATIONS

EP Application No. 12189685.5, filed on Oct. 24, 2012 with EPO.
(Continued)

*Primary Examiner* — Gerald L Sung
*Assistant Examiner* — Scott Walthour
(74) *Attorney, Agent, or Firm* — Buchanan Ingersoll & Rooney PC (57) ABSTRACT

The invention refers to a sequential combustor arrangement including a first burner, a first combustion chamber, a dilution burner for admixing a dilution gas and a second fuel via a dilution-gas-fuel-admixer to the first combustor combustion products. The dilution-gas-fuel-admixer has at least one streamlined body which is arranged in the dilution burner for introducing the at least one second fuel into the dilution burner through at least one fuel nozzle, and which has a streamlined cross-sectional profile and which extends with a longitudinal direction perpendicularly or at an inclination to a main flow direction prevailing in the dilution burner. The streamlined body includes a dilution gas opening for admixing dilution gas into the first combustor combustion products upstream of the at least one fuel nozzle. The disclosure further refers to a method for operating a gas turbine with such a sequential combustor arrangement.

16 Claims, 7 Drawing Sheets

(51) Int. Cl.
 *F23R 3/18* (2006.01)
 *F23R 3/20* (2006.01)
 *F02C 7/228* (2006.01)

(52) U.S. Cl.
 CPC .................. *F23R 3/20* (2013.01); *F23R 3/34* (2013.01); *F05D 2220/32* (2013.01); *F23R 2900/03341* (2013.01)

(56) References Cited

U.S. PATENT DOCUMENTS

| 7,934,381 | B2 | 5/2011 | Eroglu et al. |
| 2004/0211186 | A1 | 10/2004 | Stuttaford et al. |
| 2009/0044539 | A1 | 2/2009 | Eroglu et al. |
| 2012/0324863 | A1 | 12/2012 | Winkler et al. |

FOREIGN PATENT DOCUMENTS

| EP | 0 321 809 A1 | 6/1989 |
| EP | 2 722 591 A1 | 4/2014 |
| GB | 2 216 999 A | 10/1989 |
| JP | 2009-531643 A | 9/2009 |
| WO | 2011/054760 A1 | 5/2011 |

OTHER PUBLICATIONS

Office Action (Notification of Reasons for Refusal) dated Sep. 7, 2015, by the Japanese Patent Office in corresponding Japanese Patent Application No. 2014-165470, and an English Translation of the Office Action. (5 pages).

Office Action (Text of Decision on Rejection) dated Apr. 5, 2017, by the Chinese Patent Office in corresponding Chinese Patent Application No. 201410401041.1, and an English Translation of the Office Action. (16 pages).

* cited by examiner

SEQUENTIAL COMBUSTION WITH DILUTION GAS MIXER

CROSS-REFERENCE TO RELATED APPLICATIONS

This application claims priority to European application 13180583.0 filed Aug. 15, 2013, the contents of which are hereby incorporated in its entirety.

TECHNICAL FIELD

The invention refers to a sequential combustor arrangement for a gas turbine with admixing dilution gas into the sequential combustor arrangement. The invention additionally refers to a method for operating a gas turbine with admixing dilution gas into a sequential combustor arrangement.

BACKGROUND

Due to increased power generation by unsteady renewable sources like wind or solar existing gas turbine based power plants are increasingly used to balance power demand and to stabilize the grid. Thus improved operational flexibility is required. This implies that gas turbines are often operated at lower load than the base load design point, i.e. at lower combustor inlet and firing temperatures.

At the same time, emission limit values and overall emission permits are becoming more stringent, so that it is required to operate at lower emission values, keep low emissions also at part load operation and during transients, as these also count for cumulative emission limits.

State-of-the-art combustion systems are designed to cope with a certain variability in operating conditions, e.g. by adjusting the compressor inlet mass flow or controlling the fuel split among different burners, fuel stages or combustors. However, this is not sufficient to meet the new requirements.

To further reduce emissions and to increase operational flexibility sequential combustion has been suggested in DE 10312971 A1. Depending on the operating conditions, in particular on the hot gas temperature of a first combustion chamber, it can be necessary to cool the hot gases before they are admitted to a second burner (also called sequential burner). This cooling can be advantageous to allow fuel injection and premixing of the injected fuel with the hot flue gases of the first combustor in the second burner.

Good control of the inlet temperature to the second combustion chamber and good mixing of fuel injected in the second burner with the gases leaving the first combustor is a prerequisite for stable combustion with low emission values. However, the additional length required in the hot gas flow path for admixing dilution gas and fuel increases the cost of the gas turbine. In addition the stepwise cooling by admixing of dilution gas in a mixer followed by fuel injection can lead to an increase in the overall pressure drop of such a combustor arrangement.

SUMMARY

The object of the present disclosure is to propose a sequential combustor arrangement with a burner comprising means for admixing dilution gas and the second fuel between the first combustion chamber and the second combustion chamber. Such a "dilution burner" has to provide the proper inlet flow conditions for the second combustion chamber. In particular the hot gases are cooled to predetermined hot gas temperatures. Further, velocity distribution, oxygen and fuel content can be conditioned (e.g. controlled to a prescribed profile) for the second combustion chamber with proper admixing of dilution gas.

Deviations from prescribed inlet temperatures may result in high emissions (e.g. NOx, CO, and unburned hydrocarbons) and/or flashback in the dilution burner. Flashback and NOx are induced by the reduced self-ignition time for the injected fuel due to a high inlet gas temperature or high oxygen concentration, which causes earlier ignition (leading to flashback) or reduced time for fuel air mixing resulting in local hot spots during combustion and consequently increased NOx emission. Low temperature regions can cause CO emissions, due to the increased self-ignition time. This can reduce the time for CO to $CO_2$ burnout, and a reduced local flame temperature, which can further slowdown the CO to $CO_2$ burnout. Finally local hot spots may lead to overheating in certain regions downstream of the mixer.

Dilution gas can for example be compressed air or a mixture of air and flue gases of a gas turbine. Also compressed flue gases can be used as dilution gas.

According to an embodiment a sequential combustor arrangement comprises a first burner, a first combustion chamber, a dilution burner for admixing a dilution gas and a second fuel, and a second combustion chamber arranged sequentially in a fluid flow connection. The dilution burner comprises a dilution-gas-fuel-admixer for admixing a dilution gas and a second fuel to the first combustor combustion products leaving the first combustion chamber during operation.

The first fuel and second fuel can be the same type of fuel, e.g. both gaseous or both liquid fuel and come from the same source or can be different fuel types provided from different fuel sources.

The dilution-gas-fuel-admixer has at least one streamlined body which is arranged in the dilution burner with at least one fuel nozzle for introducing the at least one fuel into the dilution burner. The streamlined body has a streamlined cross-sectional profile which extends with a longitudinal direction perpendicularly or at an inclination to a main flow direction prevailing in the dilution burner. Upstream of the at least one fuel nozzle the at least one streamlined body of the dilution-gas-fuel-admixer comprises a dilution gas opening for admixing dilution gas into the first combustor combustion products.

According to another embodiment the dilution gas opening is dimensioned such that during operation the mass flow ratio of the first combustor combustion products to the mass flow of dilution gas admixed through the dilution gas opening is in a range of 0.5 to 2. Preferably the dilution gas opening is dimensioned such that during operation the mass flow ratio in a range of 0.7 to 1.5, and most preferably in the range of 0.9 to 1.1.

Specifically the dilution gas opening is directed parallel to the main flow direction of the first combustor combustion products leaving the first combustor during operation. In particular the dilution gas opening is directed to release dilution gas parallel to the main flow at the location of the dilution gas opening.

According to another embodiment the ratio of the flow area for first combustor combustion products at the location of the dilution gas openings to the flow area of dilution gas opening is in the range of 1 to 10. Preferably the ratio of flow areas is in the range of 2 to 7 and most preferably in the range of 4 to 6.

According to a further embodiment of the sequential combustor arrangement the dilution-gas-fuel-admixer has at least two dilution gas openings for admixing dilution gas into the first combustor combustion products. The at least two dilution gas openings for admixing dilution gas into the first combustor combustion products are formed as slots, which extend from lateral surfaces of the streamlined body of the dilution-gas-fuel-admixer towards the flow area of the first combustor combustion products, i.e. normal to the longitudinal extension of the stream lined body.

Specifically the height of the slots can be determined as a function of the temperature distribution and/or velocity distribution of the first combustor combustion products entering the dilution burner. In particular the slot height can be basically proportional to the temperature difference between the hot gas at the corresponding position of the slot and the temperature of the dilution gas. Since the dilution gas admixed through the slot is proportional to the slot height the cooling effect of the dilution gas is proportional to the slot height and an inhomogeneous temperature profile at the exit of the first combustion chamber can be equalized with a matched height distribution; e.g. a slot with a large height in regions of high temperature and a slot a small height in a region of low temperature.

Alternatively the height of the slots can determined as a function of the position in the longitudinal direction of the streamlined body.

The height distribution can be a simple linear function with the height increasing from one end of the slot to the other. It can be any curve or have a reduced height towards the end of the slot, close the side walls of the dilution burner because the temperature might already be reduced due to wall cooling in the dilution burner or the combustion chamber.

According to another embodiment a vortex generator is arranged on at least one lateral surfaces of the streamlined body.

The vortex generators can for example be of triangular shape with a triangular lateral surface converging with the lateral surface upstream of the vortex generator, and two side surfaces essentially perpendicular to a central plane of the streamlined body. The two side's surfaces converge at a trailing edge of the vortex generator. This trailing edge is typically just upstream of the corresponding fuel nozzle.

According to yet another embodiment the trailing edges of the streamlined body are provided with at least two lobes in opposite transverse directions with reference to a central plane of the streamlined body. At the position of the dilution gas openings the width of cross section of the streamlined body (normal to the flow direction of the main flow at the location of the dilution gas opening) is reduced to increase the flow area in the dilution burner. The ratio of the sum of cross section of the dilution gas openings to the area of the largest cross section of the streamlined burner downstream of the dilution gas openings can for example be in the order of 0.1 to 2 or even larger. According to one embodiment this ratio is in the range of 0.5 to 1.5.

Besides the sequential combustor arrangement a gas turbine with such a sequential combustor arrangement and a method for operating a gas turbine with such a sequential combustor arrangement are the subject of the present disclosure.

Such a gas turbine comprises at least a compressor, a sequential combustor arrangement and a turbine, wherein the sequential combustor arrangement has a first burner, a first combustion chamber, a dilution burner with a dilution-gas-fuel-admixer, and a second combustion chamber arranged sequentially in a fluid flow connection.

According to one embodiment the method for operating such a gas turbine comprises the following steps:
 compressing the inlet gas in the compressor, admixing a first fuel in the first burner,
 burning the resulting mixture of compressed inlet gas and fuel in the first combustor to obtain first combustor combustion products,
 admixing a dilution gas and a second fuel to the first combustor combustion products with the dilution-gas-fuel-admixer,
 burning the mixture of first combustor combustion products, second fuel, and dilution gas in the second combustion chamber to obtain second combustor combustion products, and
 expanding the second combustion chamber combustion products also called hot gas in the turbine.

Before combustion the mixture of first combustor combustion products, second fuel, and dilution gas in the second combustion chamber to obtain second combustor combustion products in the second combustion chamber the first combustor combustion products, second fuel, and dilution gas are at least partly mixed in the dilution-gas-fuel-admixer.

For admixing, the second fuel is introduced into the dilution burner with a dilution-gas-fuel-admixer having at least one streamlined body which is arranged in the dilution burner. The second fuel can be injected through at least one fuel nozzle from the streamlined body. The at least one streamlined has a streamlined cross-sectional profile which extends with a longitudinal direction perpendicularly or at an inclination to a main flow direction prevailing in the dilution burner. From the at least one streamlined body dilution gas is admixed via at least one dilution gas opening into the first combustor combustion products upstream of the at least one fuel nozzle.

Specifically the mass flow ratio of the mass flow of first combustor combustion products entering the dilution burner to the mass flow of dilution gas admixed through the dilution gas opening is in the range of 0.5 to 2. Preferably the ratio is in the range of 0.7 to 1.5, and most preferably the ratio is in a range of 0.9 to 1.1.

According to a further embodiment the dilution gas is injected into the dilution gas burner through the dilution gas opening in a direction within a maximum deviation of 20° to the flow direction of the main flow direction of the first combustor combustion products at the point of injection. Ideally the dilution gas is injected into the dilution gas burner through the dilution gas opening parallel to the flow direction of the main flow of the first combustor combustion products.

According to another embodiment of the method the dilution gas is injected into the dilution gas burner through the dilution gas opening with the same average velocity as the average flow velocity of the first combustor combustion products at the point of injection or within a maximum deviation of 30% to the average flow velocity of the first combustor combustion products at the point of injection.

Injection of dilution gas with the same flow direction and/or same velocity as the flow direction, respectively the same flow velocity as the flow of the combustion products of the first combustor reduces the pressure loss upon injection of the dilution gas.

In such a configuration dilution gas and combustion products of the first combustor can flow parallel to each other along the streamlined body. Downstream of the openings for admixing dilution gas the fuel can be injected practically into the dilution gas, and all three fluids: combustion products of the first combustor, dilution gas and fuel can be mixed in one step. For good mixing of these three fluids vortex generators can be arranged on at least one lateral surfaces of the streamlined body. Alternatively the trailing edges of the streamlined body can be provided with at least two lobes in opposite transverse directions relative to a reference to a central plane of the streamlined body.

According to a further embodiment of the method the dilution gas is admixed into the first combustor combustion products through at least two dilution gases opening, which are formed as slots. Each of these slots extends from a lateral surface of the streamlined body of the dilution-gas-fuel-admixer towards the flow area of the first combustor combustion products (i.e. normal to the lateral surface of the streamlined body).

According to yet another embodiment the mass flow distribution of injected dilution gas in longitudinal direction of the streamlined body is determined as a function of the temperature distribution and/or velocity distribution of the first combustor combustion products entering the dilution burner. Typically more dilution gas is injected into regions with higher temperature than into a region with a lower temperature.

Alternatively or in combination the mass flow distribution of injected dilution gas in longitudinal direction of the streamlined body is determined as a function of the position along the longitudinal direction of the streamlined body.

Cooling of the streamlined body can be required. In particular upstream of the location of the dilution gas openings the streamlined body is exposed to the hot combustion products of the first combustor. According to one embodiment a cooling gas is used to cool external surface of the streamlined body. Typically, most of the fluid added from the streamlined body is dilution gas. Specifically the ratio of dilution gas to cooling gas is greater than 2; preferably the ratio is greater than 5, or even up to 20 or 50. Cooling and dilution gas can have the same composition and can come from the same source.

A local high oxygen concentration can have a similar effect as a local high temperature, e.g. leading to fast reaction, consequently to reduce the available time for mixing before self-ignition occurs, high combustion temperatures, increased NOx emissions and possibly flash back. A local low oxygen concentration can have a similar effect as a local low temperature, e.g. leading to slow reaction, consequently to increased CO and UHC (unburned hydrocarbon) emissions. Therefore the admixing of dilution gas can be distributed to adjust the oxygen concentration in the gas leaving the dilution burner.

The dilution-gas-fuel-admixer can also be combined with dampers or as connecters to damping volumes as described in the European patent application EP12189685, which is incooperated by reference.

The gas turbine can include a flue gas recirculation system, in which a part of the flue gas leaving the turbine is admixed to the compressor inlet gas of the gas turbine.

Different cooling technologies might be used in the cooling zones. For example effusion cooling, impingement cooling or convective cooling or a combination of cooling methods can be used.

Referring to a sequential combustion the combination of combustors can be disposed as follows:

Both, the first and second combustors are configured as sequential can-can architecture.

The first combustor is configured as an annular combustion chamber and the second combustor is configured as a can configuration.

The first combustor is configured as a can-architecture and the second combustor is configured as an annular combustion chamber.

Both, the first and second combustor are configured as annular combustion chambers.

Different burner types can be used. For the first combustor so called EV burner as known for example from the EP 0 321 809 or AEV burners as known for example from the DE195 47 913 can for example be used. Also a BEV burner comprising a swirl chamber as described in the European Patent application EP12189388.7, which is incorporated by reference, can be used. In a can architecture a single or a multiple burner arrangement per can combustor can be used. Further, a flamesheet combustor as described in US2004/0211186, which is incorporated by reference, can be used as first combustor.

BRIEF DESCRIPTION OF THE DRAWINGS

The disclosure, its nature as well as its advantages, shall be described in more detail below with the aid of the accompanying schematic drawings.

Referring to the drawings.

DETAILED DESCRIPTION

Figure 1:
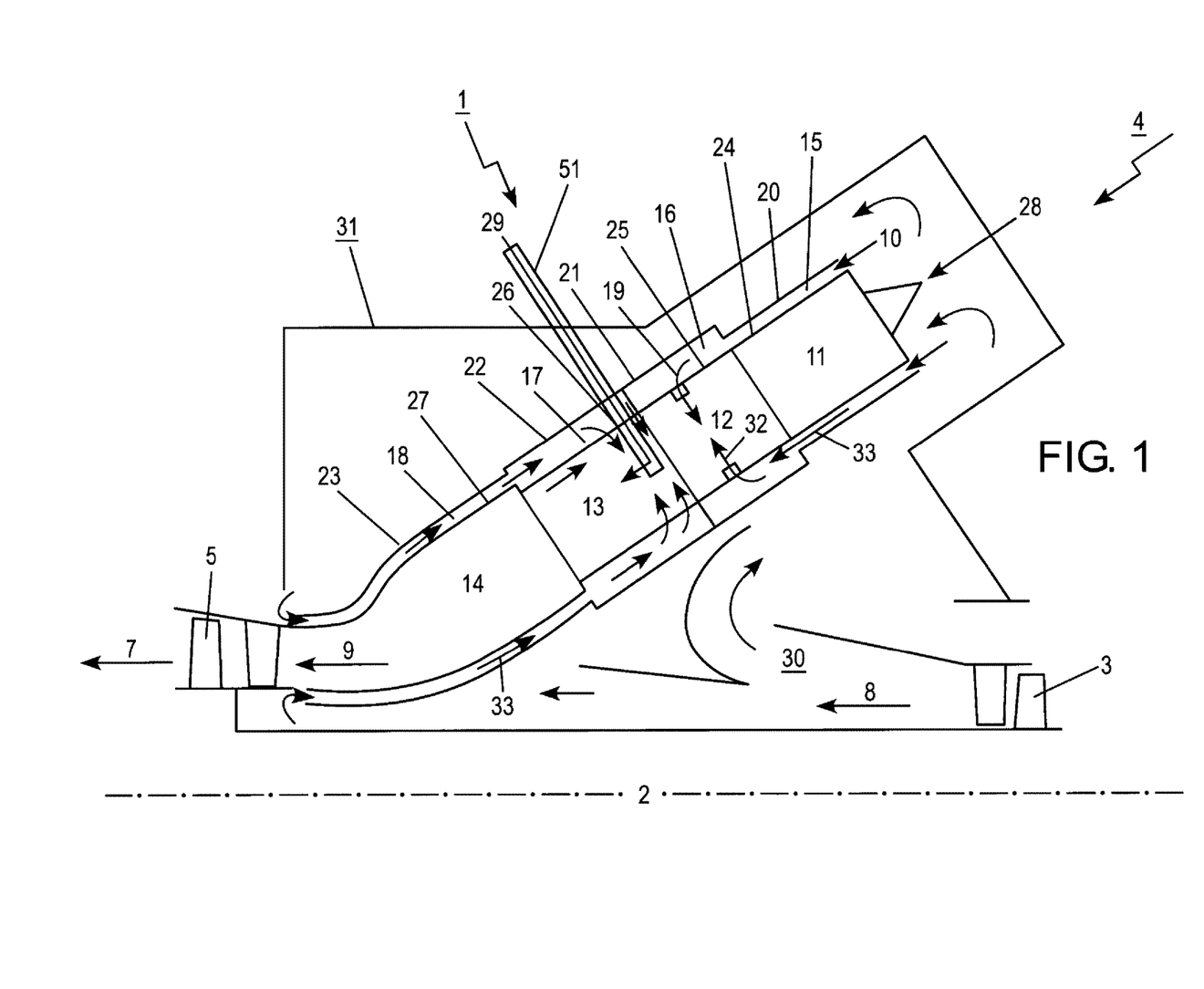
FIG. 1 shows a gas turbine with a sequential combustion arrangement with a first burner, first combustion chamber, a mixer for admixing dilution gas, a second burner, and a second combustion chamber.

FIG. 1 shows a gas turbine 1 with a sequential combustor arrangement 4. It comprises a compressor 3, a sequential combustor arrangement 4, and a turbine 5.

The sequential combustor arrangement 4 comprises a first burner 10, a first combustion chamber 11, and a mixer 12 for admixing a dilution gas 32 to the hot gases leaving the first combustion chamber 11 during operation. Downstream of the mixer 12 the sequential combustor arrangement 4 further comprises a second burner 13, and a second combustion chamber 14. The first burner 10, first combustion chamber 11, mixer 12, second burner 13 and second combustion chamber 14 are arranged sequentially in a fluid flow connection. The sequential combustor arrangement 4 is housed in a combustor casing 31. The compressed gas 8 leaving the compressor 3 passes through a diffusor 30 for at least partly recovering the dynamic pressure of the gas leaving the compressor.

The sequential combustor arrangement 4 further comprises a first combustion chamber cooling zone with a first cooling channel 15 which is delimited by the first combustion chamber wall 24 and a first jacket 20, which is enclosing the first combustion chamber wall 24. It comprises a mixer cooling zone with a second cooling channel 16 which is delimited by a mixer wall 25 and a second jacket 21, which is enclosing the mixer wall 25. It comprises a second burner cooling zone with a third cooling channel which is delimited by a second burner wall 26 and a third jacket 22, which is enclosing the second burner wall 26. It also comprises a second combustion chamber cooling zone with a fourth cooling channel 18, which is delimited by a second combustion chamber wall 27, and a fourth jacket 23, which is enclosing the second combustion chamber wall 27.

Compressed gas 8 is fed into the first cooling channel 15 as cooling gas 33 at an upstream end (relative to the hot gas flow direction) and flows through the first cooling channel 15 parallel to the main flow direction of the hot gas flow in the first combustion chamber 11. After passing through the first cooling channel 15 the cooling gas 33 enters the second cooling channel for cooling the mixer. After at least partly cooling the mixer the cooling gas 33 is fed into the dilution gas inlet 19 and admixed to the hot gas as dilution gas 32 in the mixer 12.

Compressed gas 8 is also fed into the fourth cooling channel 18 as cooling gas 33 at a downstream end (relative to the hot gas flow direction) and flows in counter flow to the main flow direction of the hot gas flow in the second combustion chamber 14. After passing through the fourth cooling channel 18 the cooling gas 33 enters the third cooling channel 17 at a downstream end (relative to the hot gas flow direction) and flows in counter flow to the main flow direction of the hot gas flow in the second burner 13. After cooling the second combustion chamber wall 27 and the second burner wall 26 the cooling gas 33 is fed to the second burner 13. The cooling gas 33 can for example be fed to the second burner 13 as cooling gas, e.g. as film cooling gas or diffusion cooling. Part of the cooling gas 33 can already be fed to the hot gas 9 in the second combustion chamber 14 during cooling of the second combustion chamber wall 27 (not shown).

A first fuel 28 can be introduced into the first burner 10 via a first fuel injection, mixed with compressed gas 8 which is compressed in the compressor 3, and burned in the first combustion chamber 11. Dilution gas 32 is admixed in the subsequent mixer 12. A second fuel 29 can be introduced into the second burner 13 via a second fuel injector 51, mixed with hot gas leaving the mixer 12, and burned in the second combustion chamber 14. The hot gas leaving the second combustion chamber 14 is expanded in the subsequent turbine 5, performing work. The turbine 5 and compressor 3 are arranged on a shaft 2.

The remaining heat of the exhaust gas 7 leaving the turbine 5 can be further used in a heat recovery steam generator or boiler (not shown) for steam generation.

In the example shown here compressed gas 8 is admixed as dilution gas 32. Typically compressor gas 8 is compressed ambient air. For gas turbines with flue gas recirculation (not shown) the compressor gas is a mixture of ambient air and recirculated flue gas.

Typically, the gas turbine system includes a generator (not shown) which is coupled to a shaft 2 of the gas turbine 1. The gas turbine 1 further comprises a cooling system for the turbine 5, which is also not shown as it is not subject of the invention.

Figure 2:
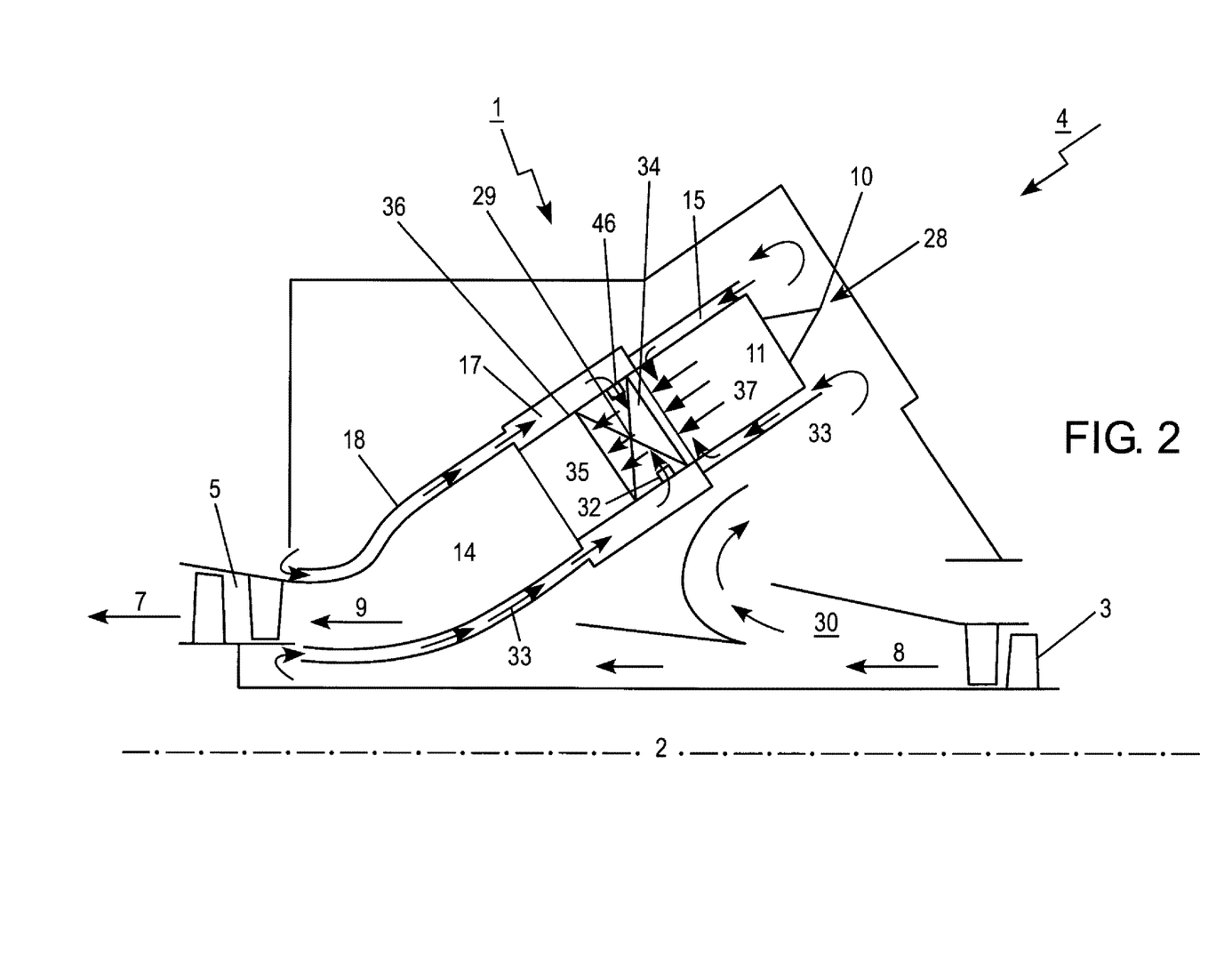
FIG. 2 shows a gas turbine with a sequential combustion arrangement in annular architecture with a first burner, first combustion chamber, a dilution burner, and a second combustion chamber.
Figure 3:
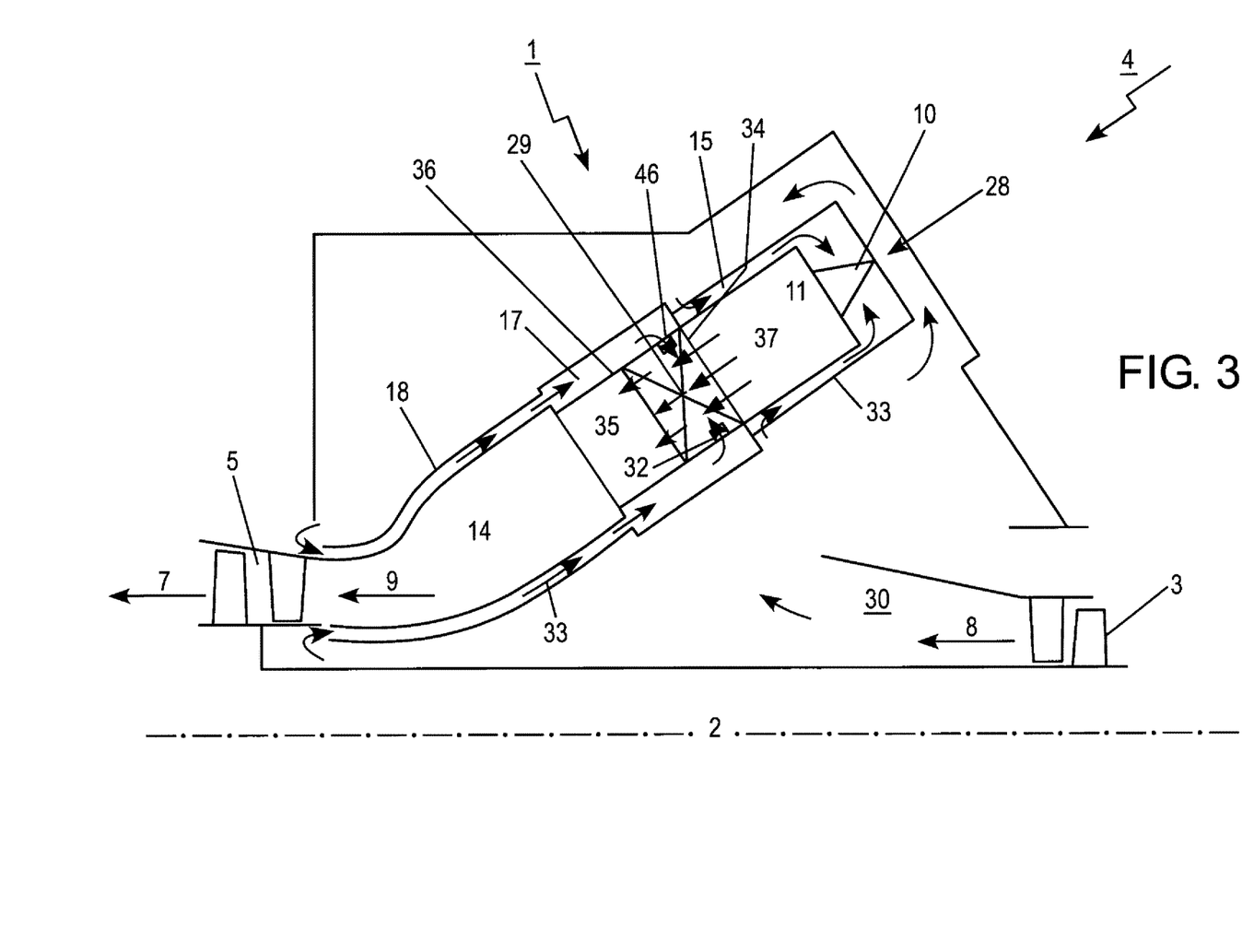
FIG. 3 shows a gas turbine with a sequential combustion arrangement in annular architecture with a first burner, counter flow cooling of the first combustion chamber, a first combustion chamber, a dilution burner, and a second combustion chamber.
Figure 4:
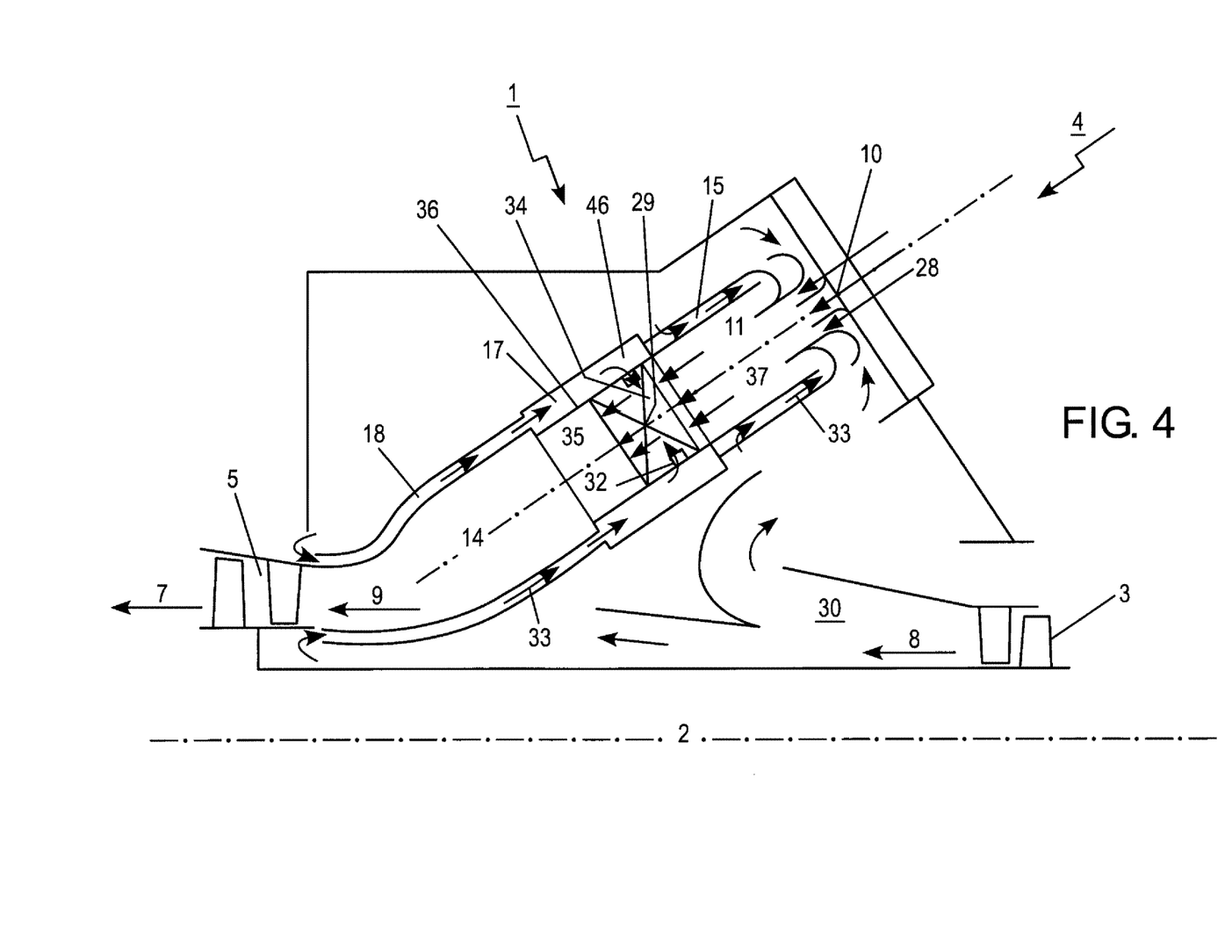
FIG. 4 shows a gas turbine with a sequential combustion arrangement in can architecture with a first burner, first combustion chamber, a dilution burner, and a second combustion chamber.

Different exemplary embodiments of the sequential combustor arrangement with a dilution burner are shown in FIGS. 2 to 4. Details of different exemplary embodiments of the dilution burner are shown in FIGS. 5 to 10.

The embodiment of FIG. 2 differs from the combustor arrangement of FIG. 1 in that the mixer 12 and second burner 13 are replaced by a dilution burner 35. In particular the separate mixer 12 and second fuel injector 51 can be replaced by one component. The dilution burner 35 comprises dilution burner walls 36 delimiting the hot gas path, and a dilution-gas-fuel-admixer 34 arranged in the hot gas path of the dilution burner 35. The hot first combustor combustion products 37 enter directly into the dilution burner 35 without any prior cooling. The Second fuel 29 and dilution gas 32 is supplied via the dilution-gas-fuel-admixer 34. In the example shown the dilution gas 32 is feed into the dilution-gas-fuel-admixer 34 via a dilution gas feed 46 from the third cooling channel 17 enclosing the dilution burner 35.

The dilution gas 32 can also be supplied from other sources as for example directly from the compressor diffusor 30 or from the first cooling channel 15.

Like in burner arrangement of FIG. 1 compressed gas 8 is fed into the fourth cooling channel 18 as cooling gas 33 at a downstream end (relative to the hot gas flow direction) and flows in counter flow to the main flow direction of the hot gas flow in the second combustion chamber 14. After passing through the fourth cooling channel 18 the cooling gas 33 enters the third cooling channel 17 at a downstream end (relative to the hot gas flow direction) and flows in counter flow to the main flow direction of the hot gas flow in the dilution burner 35. After cooling the second combustion chamber wall 27 the cooling gas 33 is fed to the dilution burner 35. Finally, after cooling the dilution burner wall 36 the cooling gas is used as dilution gas 32.

The embodiment of FIG. 3 is based on FIG. 2. In this example the dilution burner and cooling scheme of the first burner 10 is changed. The cooling gas 33 cools the first combustion chamber 11 in a counter flow arrangement. After cooling the first combustion chamber 11 the cooling gas 33 enters a burner hood which guides the cooling gas 33 into the first burner 10.

The embodiment of FIG. 4 is based on FIG. 2. In this example the dilution burner and cooling scheme is unchanged but a sequential combustion arrangement in a can architecture and with a flame sheet burner as first burner 10 is shown. A plurality sequential combustion arrangement in a can architecture is arranged circumferentially spaced on a radius around the axis of the gas turbine (not shown).

Figure 5:
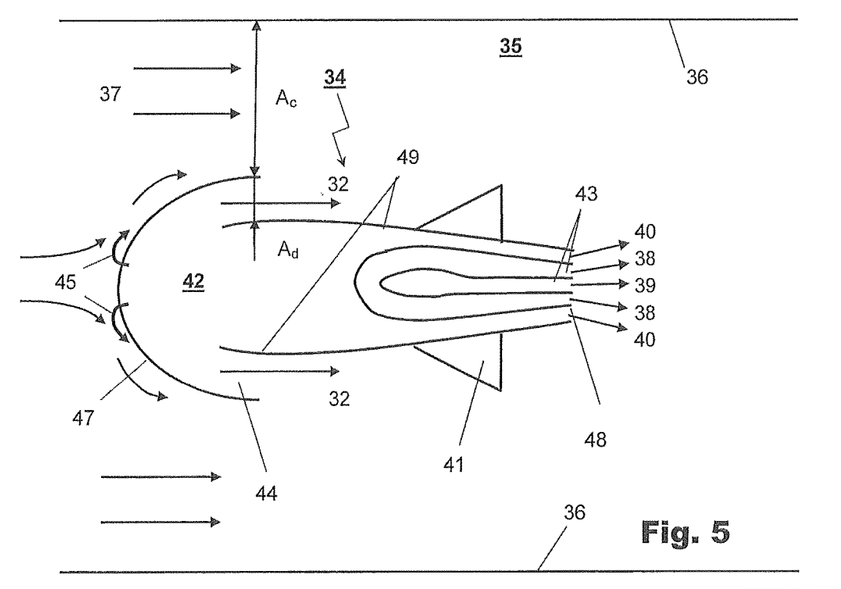
FIG. 5 shows a dilution burner with a dilution-gas-fuel-admixer with vortex generators and carrier gas injection.

FIG. 5 shows a cross section of a dilution burner 35 with a dilution-gas-fuel-admixer 34 interposed between two side walls 36 of the dilution burner 35. In this example the dilution-gas-fuel-admixer 34 comprises a streamlined body 42 with a leading edge section 47 and a trailing edge section 48, as well as vortex generators 41 attached to the lateral walls of the streamlined body 42. Between the leading edge section 47 and the trailing edge section 48 dilution gas openings 44 are arranged, facing in a downstream direction of the flow of the first combustor combustion products 37 for injecting the dilution gas 32 in the same direction as the main flow. At the location of the dilution gas openings 44 the width of cross section of the streamlined body is reduced to increase the flow area in the dilution burner by the flow area $A_d$ of dilution gas opening 44. Upstream of the dilution gas opening 44 the flow area in the dilution burner was equal to the flow area for first combustion products $A_c$.

For cooling of the leading edge section 47 cooling gas 45 can be injected through cooling holes. Typically a film cooling can be applied for the leading edge section 47.

In the streamlined body 42 ducts are provided to feed gaseous fuel 38 and liquid fuel 39 to the fuel injection nozzles 43 for injecting the fuel 38, 39. In the example shown the nozzles 43 are arranged at the trailing edge of the streamlined body 42. In addition, carrier gas 40 can be injected from opening adjacent to the fuel nozzles 43.

To enhance mixing vortex generators 41 are extending from the lateral sides of the streamlined body 42.

Figure 6:
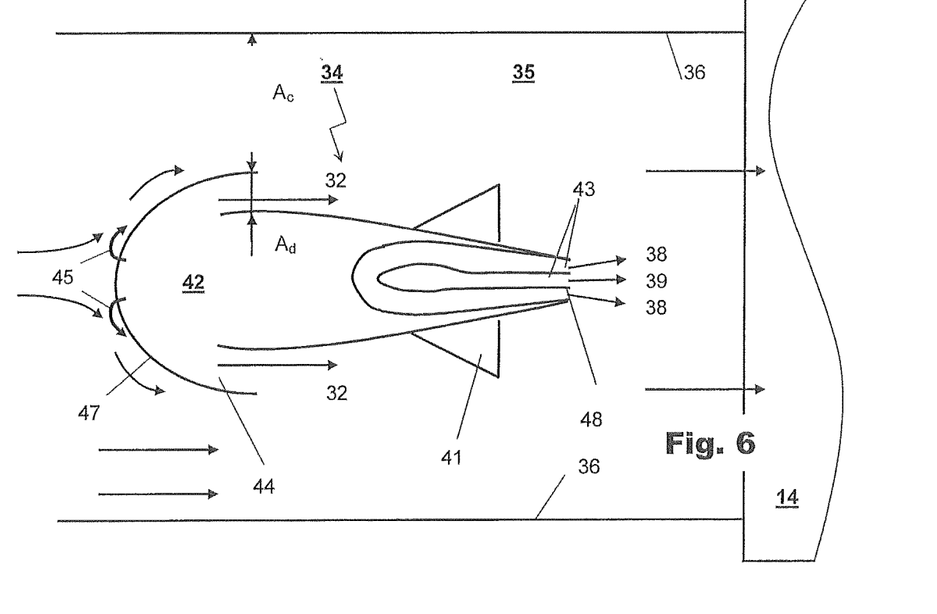
FIG. 6 shows a dilution burner with a dilution-gas-fuel-admixer and a thin trailing edge.

The example of FIG. 6 is based on FIG. 5. It differs from the example of FIG. 4 in that it has no cooling or carrier air is injected at the trailing edge. Without the air injection the trailing edge section 48 and in particular the trailing edge can be designed thinner thereby reducing losses.

In addition the second combustion chamber 14 which is arranged downstream of the dilution burner 35 is indicated in FIG. 6. In this example the cross section of the flow path is increasing towards the dilution burner 35 for flame stabilization.

Figure 7:
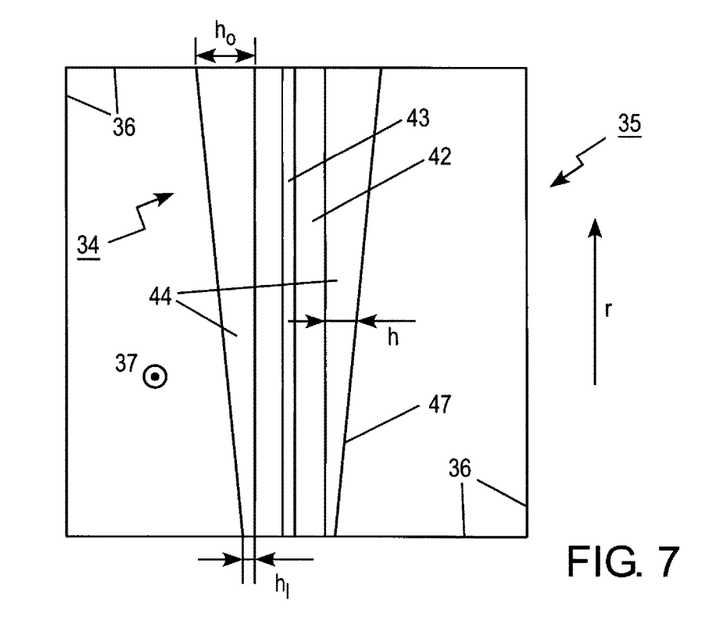
FIG. 7 shows a dilution-gas-fuel-admixer with slots for admixing dilution gas on both sides of the streamlined body.

FIG. 7 shows an embodiment of a dilution burner 35 with a rectangular flow cross section. Such dilution burners can be arranged circumferentially around the axis of a gas turbine with a radial direction r pointing away from the axis. Typically the longitudinal direction of the streamlined body 42 is parallel to the radial direction r when installed in the gas turbine. The cross section is shown from the downstream end of the dilution burner 35. The dilution-gas-fuel-admixer 34 of this example has only one fuel nozzle 43 for injecting either gaseous or liquid fuel 38, 39. The trailing edge section 48 is extending on both sides of the nozzle 43. A dilution gas opening 44 is arranged on both sides of the trailing edge section 48. The dilution gas opening 44 has the form of a slot extending in radial direction r. The height h of the slot is linearly increasing from an inner slot height $h_i$ to an outer slot height $h_o$. The slot height is determined by the downstream end of the leading edge section 47.

Figure 8:
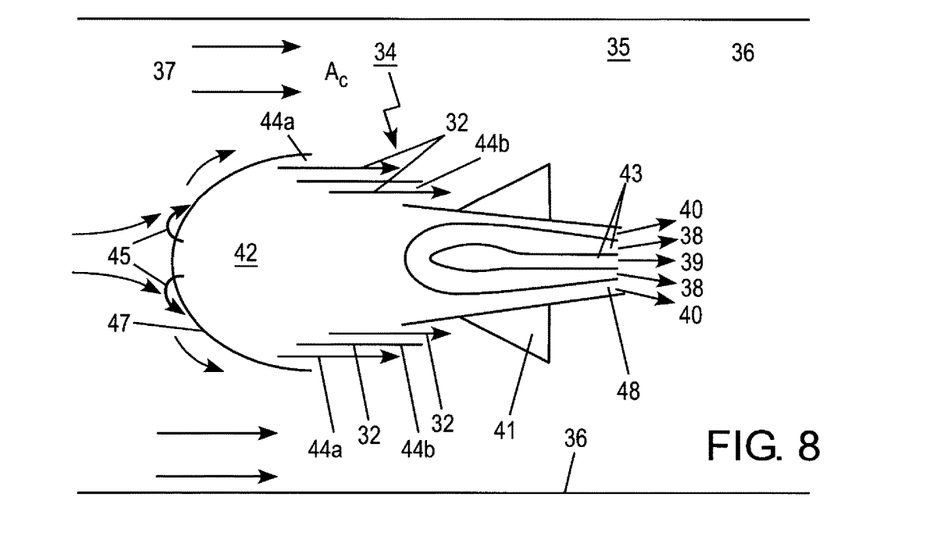
FIG. 8 shows a dilution burner with a dilution-gas-fuel-admixer with vortex generators, two axial staged gas openings on each side of the streamlined body and carrier gas injection.

FIG. 8 shows a cross section of a dilution burner 35 with a dilution-gas-fuel-admixer 34 interposed between two side walls 34 of the dilution burner 35 similar to FIG. 5. In this example the dilution-gas-fuel-admixer 34 comprises gas openings 44a and 44b in an axially staged arrangement, facing in a downstream direction of the flow of the first combustor combustion products 37 for injecting the dilution gas 32 in the same direction as the main flow.

Figure 9:
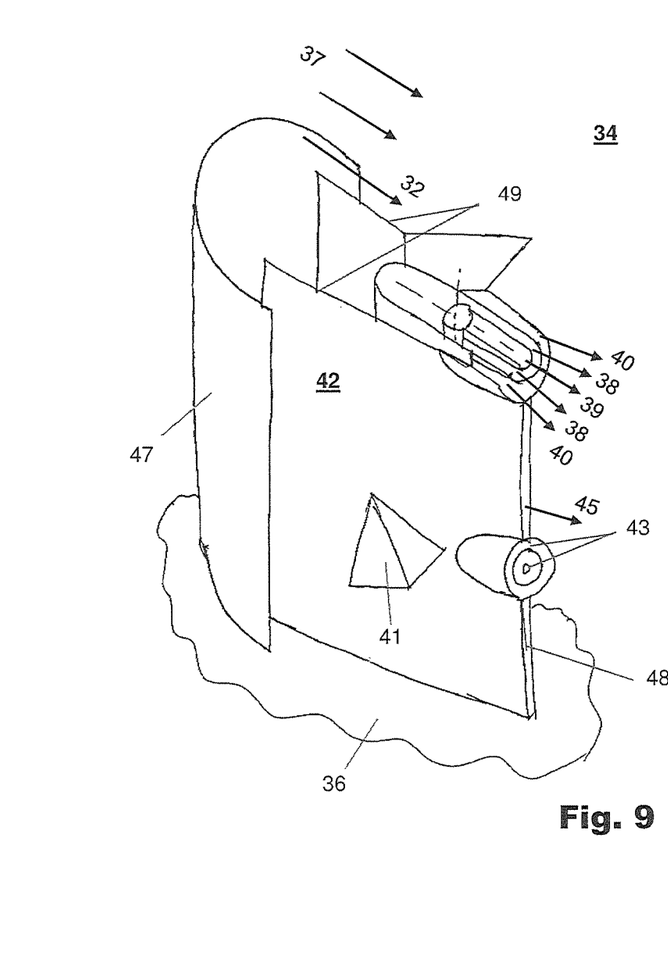
FIG. 9 shows a perspective view of dilution-gas-fuel-admixer with vortex generators, cooling gas injection from the trailing edge and carrier gas injection.

FIG. 9 shows a perspective view of dilution-gas-fuel-admixer 34 with vortex generators. It is similar to the embodiment shown in FIG. 5. However, in this example fuel 38, 39 is injected from circular, respectively annular fuel nozzles 43 arranged at the trailing edge 48. In addition cooling gas 45 is injected from a slot which is extending along the trailing edge 48 of the streamlined body 42. Carrier gas 40 can be injected via an annular opening, which is arranged coaxially around the fuel nozzles 43. To enhance mixing of fuel 38, 39 with the dilution gas 32 and first combustor combustion products 37 vortex generators 41 are arranged upstream of the fuel nozzles 43 on the lateral walls 49 of the streamlined body 42. In the example show a section of the dilution burner wall 36 is indicated. Typically the streamlined body 42 of the dilution-gas-fuel-admixer 34 extends normal to the dilution burner wall 36 into the flow path of the dilution burner.

Figure 10:
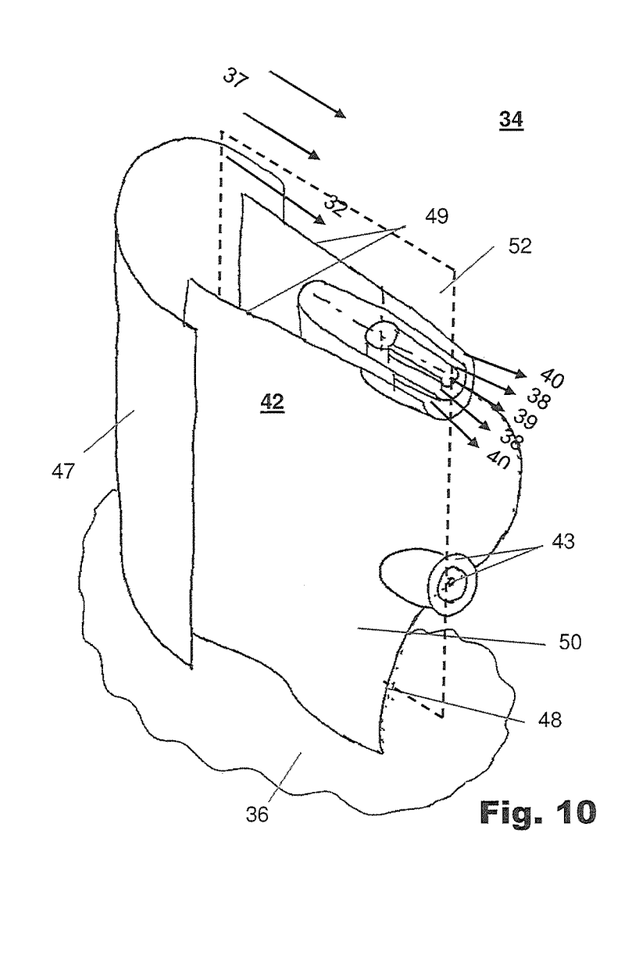
FIG. 10 shows a perspective view of dilution-gas-fuel-admixer with lobes for vortex generation and carrier gas injection.

FIG. 10 shows a perspective view of another embodiment of a dilution-gas-fuel-admixer 34. In this embodiment no vortex generators extend from the streamlined body. Instead the streamlined body comprises lobes 50 in opposite transverse directions with reference to a central plane 52 of the streamlined body 42 for vortex generation.

For all shown arrangements can or annular architectures or any combination of the two is possible. EV, AEV or BEV burners can be used for can as well as for annular architectures.

The mixing quality of the mixer 12 is crucial for a stable clean combustion since the burner system of the second combustion chamber 14 requires a prescribed inlet conditions.

All the explained advantages are not limited to the specified combinations but can also be used in other combinations or alone without departing from the scope of the disclosure. Other possibilities are optionally conceivable, for example, for deactivating individual burners or groups of burners at part load operation. Further, the cooling gas and the dilution gas can be re-cooled in a cooling gas cooler before use as cooling gas, respectively as dilution gas.

The invention claimed is:

1. A method for operating a gas turbine comprising a compressor, a sequential combustor arrangement and a turbine, the sequential combustor arrangement comprising a first burner, a first combustion chamber, a dilution burner having a dilution-gas-fuel-admixer, and a second combustion chamber arranged sequentially in a fluid flow connection with the first combustion chamber and the dilution burner, the method comprising:
   compressing an inlet gas in the compressor;
   admixing a first fuel with the compressed inlet gas to form a first mixture in the first burner;
   burning the first mixture in the first combustion chamber to obtain first combustion products;
   admixing a dilution gas and a second fuel, using the dilution-gas-fuel-admixer, with the first combustion products to form a second mixture;
   burning the second mixture in the second combustion chamber to obtain second combustion products; and
   expanding the second combustion products in the turbine;
   wherein the dilution-gas-fuel-admixer comprises at least one streamlined body arranged in the dilution burner, the at least one streamlined body comprising at least one fuel nozzle for introducing the second fuel and a streamlined cross-sectional profile, the at least one streamlined body extending in a longitudinal direction from a first side of the dilution burner to a second side of the dilution burner perpendicularly or at an inclination to a main flow direction of the first combustion products entering the dilution burner, wherein the at least one streamlined body further comprises at least one dilution gas opening for introducing dilution gas into the first combustion products upstream of each of the at least one fuel nozzle and a vortex generator, the at least one dilution gas opening being formed as a slot, the slot extending along the at least one streamlined body in the longitudinal direction of the at least one streamlined body and having a slot height perpendicular to the longitudinal direction of the at least one streamlined body, wherein the slot height increases linearly from an inner slot height to an outer slot height along the longitudinal direction of the streamlined body.

2. The method as claimed in claim 1, wherein a ratio of a mass flow of first combustion products entering the dilution burner to a mass flow of dilution gas admixed through the at least one dilution gas opening is in a range of 0.5 to 2, or alternatively the ratio is in a range of 0.7 to 1.5, and further alternatively the ratio is in a range of 0.9 to 1.1.

3. The method as claimed in claim 1, wherein the dilution gas is introduced through the at least one dilution gas opening in a direction parallel to, or within a maximum deviation of 20° to, a flow direction of the first combustion products at a location of the at least one dilution gas opening.

4. The method as claimed in claim 1, wherein the dilution gas is introduced through the at least one dilution gas opening at an average velocity which is the same as, or within a maximum deviation of 30% of, an average flow velocity of the first combustion products at a location of the at least one dilution gas opening.

5. The method as claimed in claim 1, wherein the at least one dilution gas opening comprises at least two dilution gas openings, which extend from lateral surfaces of the at least one streamlined body.

6. A sequential combustor arrangement comprising:
a first burner;
a first combustion chamber;
a dilution burner comprising a dilution-gas-fuel-admixer for admixing a dilution gas and at least one fuel to first combustion products leaving the first combustion chamber during operation; and
a second combustion chamber arranged sequentially in a fluid flow connection with the first combustion chamber and the dilution burner;
wherein the dilution-gas-fuel-admixer comprises at least one streamlined body arranged in the dilution burner for introducing the at least one fuel into the dilution burner through at least one fuel nozzle, the at least one streamlined body having a streamlined cross-sectional profile and extending in a longitudinal direction from a first side of the dilution burner to a second side of the dilution burner perpendicularly or at an inclination to a main flow direction of the first combustion products entering the dilution burner, wherein the at least one streamlined body comprises at least one dilution gas opening for introducing dilution gas into the first combustion products upstream of each of the at least one fuel nozzle and a vortex generator, the at least one dilution gas opening being formed as a slot, the slot extending along the at least one streamlined body in the longitudinal direction of the at least one streamlined body and having a slot height perpendicular to the longitudinal direction of the at least one streamlined body, wherein the slot height increases linearly from an inner slot height to an outer slot height along the longitudinal direction of the streamlined body.

7. The sequential combustor arrangement as claimed in claim 6, wherein the at least one dilution gas opening is capable of providing a mass flow of dilution gas such that during operation a ratio of a mass flow of the first combustion products to the mass flow of dilution gas is in a range of 0.5 to 2.

8. The sequential combustor arrangement as claimed in claim 6, wherein the at least one dilution gas opening is configured to introduce dilution gas parallel to the main flow direction of the first combustion products entering the dilution burner.

9. The sequential combustor arrangement as claimed in claim 6, wherein a ratio of a flow area for first combustion products to a flow area of the dilution gas opening is in a range of 1 to 10.

10. The sequential combustor arrangement as claimed in claim 6, wherein the at least one dilution gas opening comprises at least two dilution gas openings for introducing dilution gas into the first combustion products, the at least one streamlined body further comprising two lateral surfaces wherein the at least two dilution gas openings extend along the lateral surfaces.

11. The sequential combustor arrangement as claimed in claim 6, wherein the vortex generator is arranged on at least one lateral surface of the at least one streamlined body or, alternatively, the vortex generator is located on a trailing edge of the at least one streamlined body and includes at least two lobes extending in opposite transverse directions with respect to a central plane of the at least one streamlined body.

12. The sequential combustor arrangement as claimed in claim 7, wherein the ratio of the mass flow of the first combustion products to the mass flow of dilution gas is in a range of 0.7 to 1.5.

13. The sequential combustor arrangement as claimed in claim 12, wherein the ratio of the mass flow of the first combustion products to the mass flow of dilution gas is in a range of 0.9 to 1.1.

14. The sequential combustor arrangement as claimed in claim 1, wherein a ratio of a flow area for the first combustion products to a flow area of the dilution gas opening is in a range of 1 to 10.

15. The sequential combustor arrangement as claimed in claim 14, wherein the ratio of the flow area for the first combustion products to the flow area of the dilution gas opening is in a range of 2 to 7.

16. The sequential combustor arrangement as claimed in claim 15, wherein the ratio of the flow area for the first combustion products to the flow area of the dilution gas opening is in a range of 4 to 6.

* * * * *